United States Patent
Kato et al.

(10) Patent No.: US 7,139,412 B2
(45) Date of Patent: Nov. 21, 2006

(54) IMAGE SYNTHESIS DISPLAY METHOD AND APPARATUS FOR VEHICLE CAMERA

(75) Inventors: Koichi Kato, Hamamatsu (JP); Makoto Suzuki, Hamamatsu (JP); Yukio Fujita, Kakegawa (JP); Yuichi Hirama, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 667 days.

(21) Appl. No.: 10/128,079

(22) Filed: Apr. 23, 2002

(65) Prior Publication Data

US 2002/0196340 A1    Dec. 26, 2002

(30) Foreign Application Priority Data

Apr. 24, 2001  (JP) ............. P. 2001-126013

(51) Int. Cl.
- G06K 9/00 (2006.01)
- G06K 9/18 (2006.01)
- B60Q 1/00 (2006.01)
- H04N 7/18 (2006.01)

(52) U.S. Cl. ............ 382/104; 382/284; 340/426.23; 340/435; 340/937; 348/115; 348/118; 348/148

(58) Field of Classification Search .......... 382/104, 382/284; 348/113, 115, 118, 148; 340/933, 340/937, 426.22, 426.23, 426.33, 435–437, 340/901

See application file for complete search history.

(56) References Cited

U.S. PATENT DOCUMENTS

| 5,444,478 | A | * | 8/1995 | Lelong et al. ........... 348/39 |
|---|---|---|---|---|
| 5,892,855 | A | * | 4/1999 | Kakinami et al. ........ 382/291 |
| 5,949,331 | A | * | 9/1999 | Schofield et al. ........ 340/461 |
| 5,982,951 | A | * | 11/1999 | Katayama et al. ....... 382/284 |
| 6,215,914 | B1 | * | 4/2001 | Nakamura et al. ...... 382/284 |
| 6,275,259 | B1 | * | 8/2001 | Gowda et al. ......... 348/229.1 |
| 6,393,162 | B1 | * | 5/2002 | Higurashi ............. 382/284 |
| 6,476,855 | B1 | * | 11/2002 | Yamamoto ............ 348/148 |
| 6,919,917 | B1 | * | 7/2005 | Janssen .............. 348/143 |
| 2002/0005779 | A1 | * | 1/2002 | Ishii et al. ............ 340/436 |
| 2002/0159616 | A1 | * | 10/2002 | Ohta ................. 382/104 |
| 2004/0085447 | A1 | * | 5/2004 | Katta et al. ........... 348/143 |

FOREIGN PATENT DOCUMENTS

| EP | 1179958 A1 * | 2/2002 |
|---|---|---|
| JP | 59189781 A | 10/1984 |
| JP | 10-187929 | 7/1998 |
| JP | 11-078692 | 3/1999 |
| JP | 11-102430 | 4/1999 |
| JP | 2000-092306 | 3/2000 |
| JP | 2000-270206 | 9/2000 |
| WO | WO 00/07373 | 2/2000 |

* cited by examiner

Primary Examiner—Andrew W. Johns
Assistant Examiner—Anthony Mackowey
(74) Attorney, Agent, or Firm—Pearne & Gordon LLP

(57) ABSTRACT

When multiple cameras (CAM1) to (CAM8) for shooting the periphery of a local vehicle are mounted on the vehicle, and when obtained camera images are to be synthesized to display a synthesized image on the screen of a display device (16), the pixel data for the camera images constituting the synthesized image are compensated for, so that differences in the pixel data for adjacent camera images is reduced. For example, the pixel data are corrected so their values equal the average values of the pixel data for the adjacent camera images. Therefore, an easily viewed image, produced by synthesizing the images obtained by the multiple vehicle cameras, can be displayed on the monitor device (16).

14 Claims, 8 Drawing Sheets

SYNTHESIZED IMAGE

FLAG TABLE

FLAG TABLE

SYNTHESIZED IMAGE

FLAG TABLE

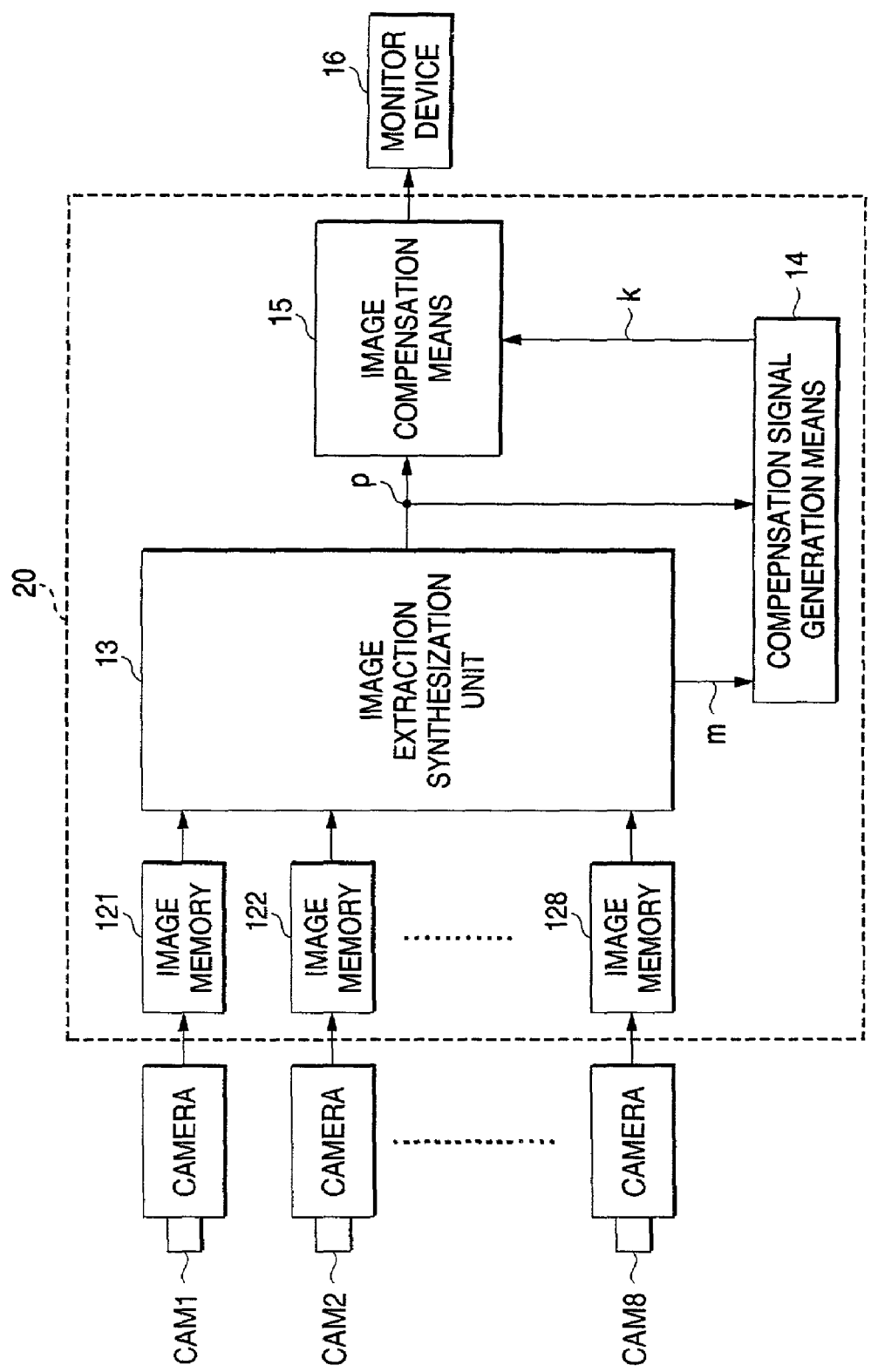

IMAGE SYNTHESIS DISPLAY METHOD AND APPARATUS FOR VEHICLE CAMERA

BACKGROUND OF THE INVENTION

1. Technical Field of the Invention

The present invention relates to an image synthesis display method, and an apparatus therefor, for synthesizing images obtained by multiple vehicular mounted cameras and for displaying the synthesized images. In particular, the present invention relates to an image synthesis display method and apparatus for a vehicle camera for generating in real time a synthesized image that can easily be viewed on a display screen.

2. Description of the Related Art

When an automobile is being driven backward, it is difficult for the driver to obtain an unobstructed view to the rear, and the angle of vision produces a blind spot. Further, even while a vehicle is moving forward, when another vehicle travelling a parallel course reaches a position whereat it is obscured by a door pillar, that vehicle disappears from the driver's sight. Recently, therefore, vehicular mounted cameras have been used to monitor peripheral locations where at the angle of a driver's field of vision produces blind spots, and images that are obtained by the cameras are displayed on a car navigation screen.

FIG. 9A is a top view of an automobile on which vehicle cameras are mounted, and FIG. 9B is a side view. Five cameras 1 to 5 are mounted on this vehicle: camera 1 explicitly monitors the rear of the vehicle; cameras 2 and 4, mounted at the front and the rear on the vehicle's left side, monitor the oblique left rear of the vehicle; and cameras 3 and 5, mounted at the front and the rear on the vehicle's right side, monitor the oblique right rear of the vehicle. Currently, more than five cameras may be mounted on a vehicle, and in some cases a total of eight cameras are used, including two cameras for providing precise monitoring at the rear and two cameras for monitoring the view to the front.

FIG. 10 is a diagram showing photos representing images obtained by the monitoring cameras 1 to 5 in FIGS. 9A and 9B. These images represent views obtained as an automobile is being backed into a parking lot. Since using a screen to sequentially monitor the images obtained by the monitoring cameras 1 to 5 is difficult for a driver, as is shown in FIG. 11, the images obtained by the cameras are converted to obtain those for which the point of origin is a virtual point located above the automobile. The thus obtained images are then synthesized, and an image is obtained that, when displayed on a screen, enables a driver to monitor at a glance the position of his or her automobile relative to peripheral objects and landscape features.

FIG. 12 is a diagram showing the screen display for an example synthesized image. Since the image presented is the view from the virtual point above the automobile, the driver can identify, on the screen, the periphery of the vehicle that is at the dead angle position. In FIG. 12, the image representing vehicle of the driver is not the synthesis image of the camera images (because it is not viewed by a camera), but an image prepared using illustration data.

However, when images obtained by multiple monitoring cameras mounted on a vehicle are merely synthesized, the resulting synthesized image tends not to be easily seen on the screen of a display device. This is because, frequently, while one specific camera may be positioned so that it obtains a clear and easily identified image, another camera may face the sun, or the view obtained by a camera may be shaded from the sun by an adjacent automobile. Since in many cases vehicle cameras are fixed, so that the directions of focus of these cameras can not be controlled, for each camera the state of recorded objects varies in a time transient manner, depending on the roughness of the road, the direction of vehicular movement and changes in the weather. Accordingly, the luminance levels and color balances of the images obtained by the cameras also vary.

As techniques for synthesizing images obtained by cameras, those disclosed in Japanese Patent Publication No. Hei. 10-187929 and Japanese Patent Publication No. Hei. 11-102430 are well known. According to these techniques, to synthesize multiple images obtained by electronic cameras and to obtain a panoramic image, a matching process is used to obtain overlapping areas between adjacent images, and a correction value for two images is obtained, based on the density values of the pixels in the overlapping area, that is used to correct the luminance and the color balance of the synthesized image and to provide a continuous, smoothly synthesized image.

According to these conventional techniques, the images to be synthesized are static images, and are also clear images that have been obtained through the efforts of the photographer, so that for image synthesis, there are very few images that are at all inappropriate.

However, when images obtained by multiple vehicle cameras are synthesized, as is described above, as time elapses the luminance and the color balance for each camera change, and even images that are inappropriate for image synthesization are fetched. Therefore, if such images are present, it is necessary to permit a driver to use a screen to identify, in real time, the peripheral state of a vehicle that is travelling several tens of kilometers an hour, and the conventional techniques, referred to merely for the synthesis of stationary images, can not be directly applied for the synthesis of images obtained by vehicle cameras.

SUMMARY OF THE INVENTION

It is, therefore, one objective of the present invention to provide an image synthesis and display method for a vehicle camera, whereby an image that can be easily seen is generated in real time by synthesizing images obtained by multiple vehicle cameras, and an apparatus therefor.

To achieve this objective, according to the present invention, provided is an image synthesis display method for a vehicle camera, whereby images obtained by multiple vehicle cameras that shoot the periphery of a local vehicle are synthesized and the synthesized image is displayed on the screen of a display device, wherein, in order to display on the screen the synthesized image obtained by the multiple vehicle cameras, of the camera images obtained by the multiple vehicular, adjacent camera images are compensated for, so that differences between the pixel data for the adjacent camera images is reduced. With this configuration, a synthesized image can easily be prepared and viewed on the screen.

Preferably, with the configuration, of all the camera images obtained by the multiple vehicle cameras, for compensation the average values of the pixel data of the adjacent camera images are equaled in order to reduce the differences. Said average values are obtained by using the entire pixel data for at least one of the adjacent camera images. Or, the average values are obtained by using pixel data for the vicinity of the local vehicle, selected from among all the pixel data, for at least one of the adjacent camera images. Or, the average values are obtained by using the pixel data for the overlapping shooting regions of the adjacent camera images. Or, the average values are obtained by using pixel data for the vicinity of the local vehicle, selected from among pixel data for the overlapping shooting regions of the adjacent camera images. With this configuration, a synthesized image can be easily viewed on the screen.

More preferably, with this configuration a flag table is prepared in correlation with pixel positions for the multiple vehicle cameras, and the average values are obtained by using pixel data displayed at pixel positions that correspond to pixel areas written in advance in the flag table. When the average values are obtained by referring to the flag table, the processing speed is increased. This configuration is also appropriate for the real-time display of the synthesized image.

Even more preferably, the values of the image data for which the differences are to be reduced represent brightness or colors, and for compensation, the differences are gradually reduced along the time axis near a target compensation value. As a result, the flickering that may accompany a screen change is further suppressed, and is less likely to tire the eyes of a user.

In addition, preferably, when three or more vehicle cameras are prepared, a camera image whose average value is nearest the average value for pixel data for all the camera images is regarded as a reference image, and the image data for the adjacent camera images are compensated for so they may be adjusted to the average value for the reference image. As a result, this configuration can cope with a case wherein multiple vehicle cameras are mounted, and a synthesized image can be easily viewed on the display.

Furthermore, preferably, the synthesized image is the one obtained immediately after there has been a viewpoint change. Then, when the image obtained from the different viewpoint is displayed, with this image the driver can intuitively verify the periphery of the vehicle.

BRIEF DESCRIPTION OF THE DRAWINGS

FIG. 5 is a diagram showing the configuration of an image synthesis display apparatus according to one embodiment of the present invention;

DETAILED DESCRIPTION OF THE PREFERRED EMBODIMENT

Figure 1:
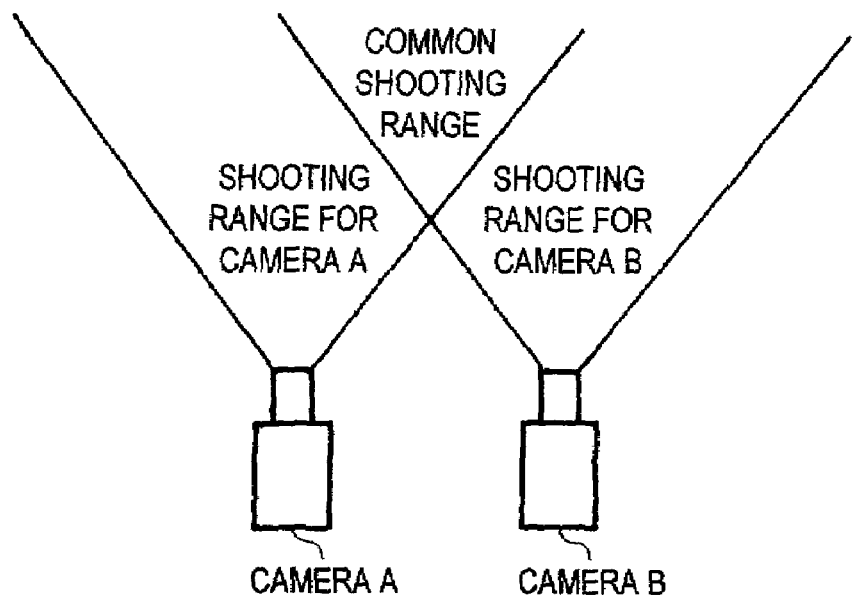
FIG. 1 is a diagram for explaining the positional relationship between two cameras, the shooting ranges of which overlap.

One embodiment of the present invention will now be described while referring to the drawings.

FIG. 1 is a diagram showing an example of the shooting ranges for two vehicle cameras. Two adjacent vehicle cameras A and B are fixedly arranged so that their shooting ranges slightly overlap. Manufacturing variances are present even among multiple vehicle cameras of the same model that are mounted on a vehicle, and the luminance and the image color balance obtained by each camera differ because each camera individually controls the ALC (auto iris control), the ELC (auto shutter control), the AGC (auto gain control) and the ATW (auto white balance). Furthermore, as previously described, since one camera could be facing the sun while another is fully shaded from the sun, when images obtained by such cameras are merely synthesized, the differences between the original images would be too great to yield an acceptable synthesized image, and it would not be easy for a driver to view such an image on a display.

Figure 2A:
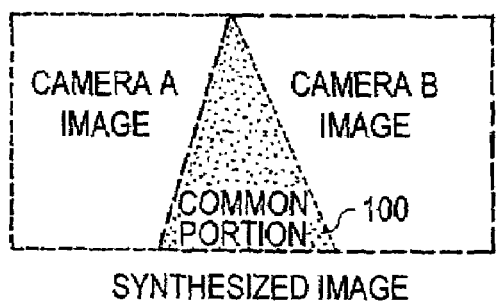
FIG. 2A is a diagram showing the relationship between camera images obtained by two cameras having overlapping shooting portions.
Figure 2B:
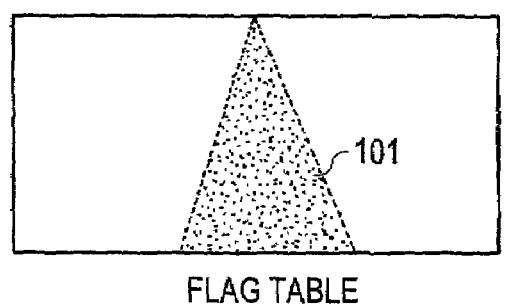
FIG. 2B is a diagram showing a flag table for the overlapping portion in FIG. 2A.

Therefore, to reduce the differences between adjacent camera images and to create a synthesized image that may be viewed easily, a compensation process is provided for adjacent camera images in accordance with the pixel value within a commonly covered range. Since the compensation process must be performed in real time while a vehicle is running, a flag table shown in FIG. 2B, which corresponds to a common area 100 in a synthesized image in FIG. 2A, is prepared in advance for each camera represented, A or B. Then, the average value for each color element (the luminance value of each R, G or B or each Y, U or V) is obtained for a pixel range 101 in the flag table (the dotted area in FIG. 2B) wherein a "1" is set for a pixel in the image obtained by the camera A. Further, as for the camera A, the average value is calculated for the pixel range 101 in the flag table wherein a "1" is set for each pixel in the image obtained by the camera B. Then, to equalize the two average values, a compensation process is performed for the pixel values of the images obtained by the cameras A and B.

Since vehicle cameras 1 to 5 are fixed to the vehicle, the portions whereat the shooting ranges of adjacent cameras (e.g., the cameras A and B in FIG. 2) overlap are fixed. Therefore, flag tables, correlated with the individual cameras, for determining the overlapped portions of shooting ranges can be prepared in advance. When a camera C is present to the right of the camera B in FIG. 1, two flag tables are prepared for the camera B: a flag table representing the range used in common with the camera A, and a flag table representing the range used in common with the camera C.

A vehicle camera tends to obtain a shot image of a blind spot near a vehicle, and it is not very useful for obtaining an image at a distance. In addition, as was described while referring to FIGS. 9 to 12, to convert an image into one viewed from a virtual viewpoint, only the state of the road near a vehicle need be satisfactorily displayed on a screen. Further, when an object is located some distance from the vehicle, an image of the object obtained by the camera A (e.g., an image wherein the camera is facing the sun) may greatly differ from an image obtained by the camera B (e.g., an image wherein the camera is shaded from the sun). If the above described compensation value is obtained by using the average values for the pixels of the object image, the compensation process performed for the image of the area in the vicinity of the vehicle may not be satisfactory.

Figure 2C:
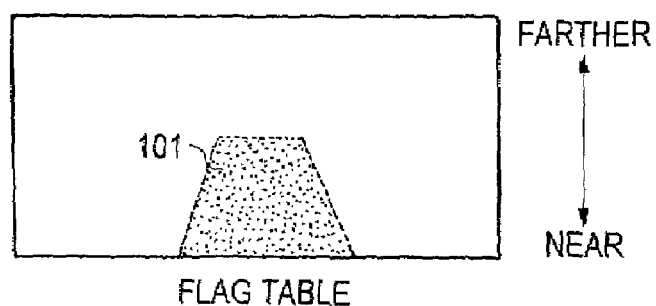
FIG. 2C is a diagram showing another flag table.

Therefore, the flag table in FIG. 2 can also be so designed that the pixel values in the common range that represent an image at a distance are not employed for the calculation of a compensation value. As is shown in FIG. 2C, in the flag table a value of "1" is set only for the pixels in the area representing the vicinity of the vehicle. Thus, a satisfactory image of the road can be displayed, the number of pixels to be calculated can be reduced, and the processing period can be shortened.

Figure 3:
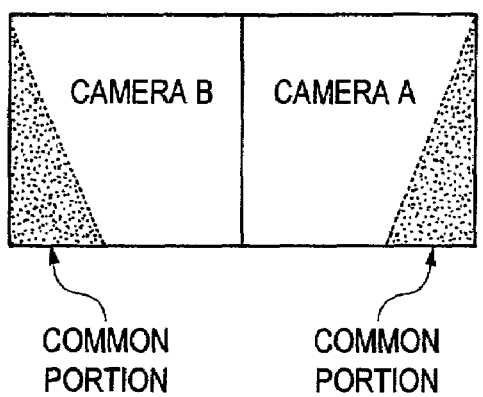
FIG. 3 is a diagram showing an example wherein the overlapping portions for the shooting ranges of two cameras are separately present on a synthesized image.

In this embodiment, a flag table is created by identifying the shooting range used in common by the adjacent cameras A and B. However, in the synthesized image in FIG. 2A the shooting ranges need not be overlapped, and so long as the location of the common shooting range can be identified, even if in a synthesized image it is separated, as is shown in FIG. 3, the flag tables can be prepared in advance.

Further, in the embodiment, the compensation value for each camera image is obtained by using the average value for each pixel in the common shooting range. However, as another compensation method, a difference between the pixel values for the camera images in the common shooting range may be obtained, and to minimize the squared sum of the differences gain control may be exercised.

Figure 4A:
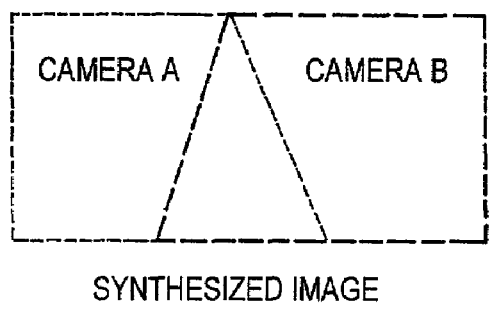
FIG. 4A is a diagram showing the relationship between two camera images that have overlapping portions.

Furthermore, in this embodiment, the average values of the pixels in the common shooting range are employed to obtain the compensation value for the luminance values (luminance values of individual colors) of images obtained by the adjacent cameras A and B. However, the common shooting range need not be employed. For example, the range encompassing the entire image obtained by the camera A and the range encompassing the entire image obtained by the camera B may be employed to calculate the compensation value. In addition, even when a synthesized image is to be prepared using images acquired by the vehicle cameras A and B that shoot the overlapped portion shown in FIG. 4A, only the pixel values in the area near the vehicle in FIG. 4B may be employed for flag tables used to calculate the average values for the camera images, and the compensation process may be performed without the overlapped portion being taken into consideration.

FIG. 5 is a diagram showing the configuration of an image synthesis display apparatus for vehicle cameras according to the embodiment of the present invention. An image synthesis display apparatus 20 images: image memories 121, 122, . . . and 128, provided in correlation with eight vehicle cameras CAM1, CAM2, . . . and CAM8; an image extraction and synthesization unit 13, for extracting and synthesizing image data held by the image memories 121 to 128; compensation signal generation means 14, for receiving, from the image extraction synthesization unit 13, camera number data m and a synthesized image output signal p, and for outputting a compensation gain k; and image compensation means 15, for performing for the synthesized image a compensation process based on the synthesized image output signal p, received from the image extraction synthesization unit 13, and the compensation gain k, received from the compensation signal generation means 14. The image synthesis display apparatus displays, on a monitor device 16 for car navigation, the synthesized image for which compensation is provided by the image compensation means 15.

The image extraction synthesization unit 13 outputs, to the compensation signal generation means 14, the camera number data m corresponding to each camera image. The compensation signal generation means 14 includes flag tables (eight in FIG. 8) correlated with the cameras. And the compensation signal generation means 14 employs pixel data for areas in the flag tables wherein "1" are set to calculate the average value of the pixel data, employs the average value to calculate a compensation gain, and outputs the compensation gain to the image compensation means 15.

Figure 7:
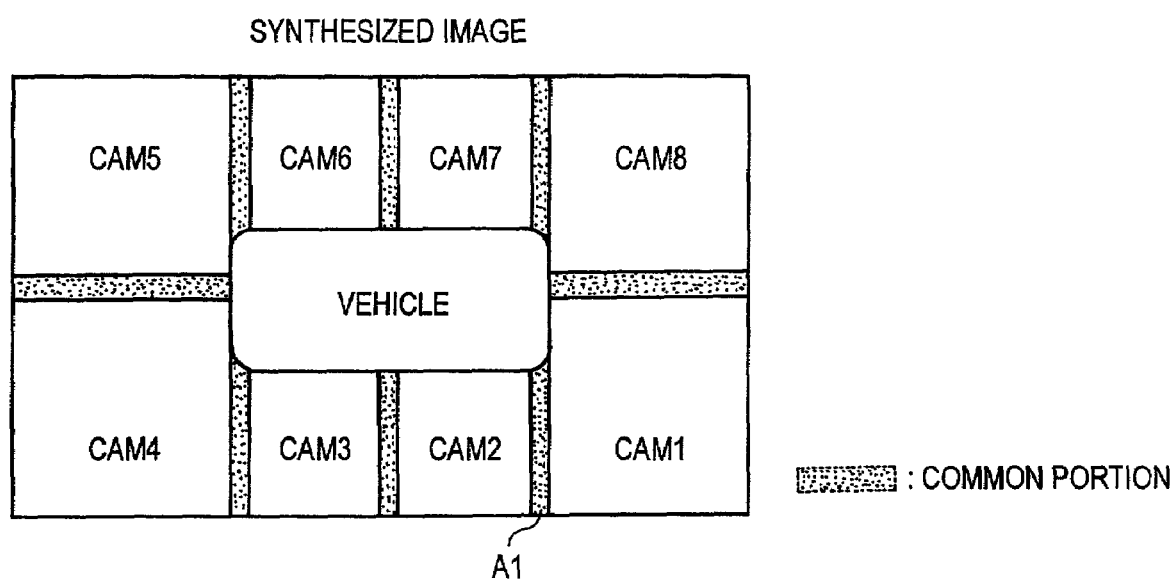
FIG. 7 is a diagram showing the structure of a synthesized image obtained by changing the viewpoints for eight camera images.
Figure 11:
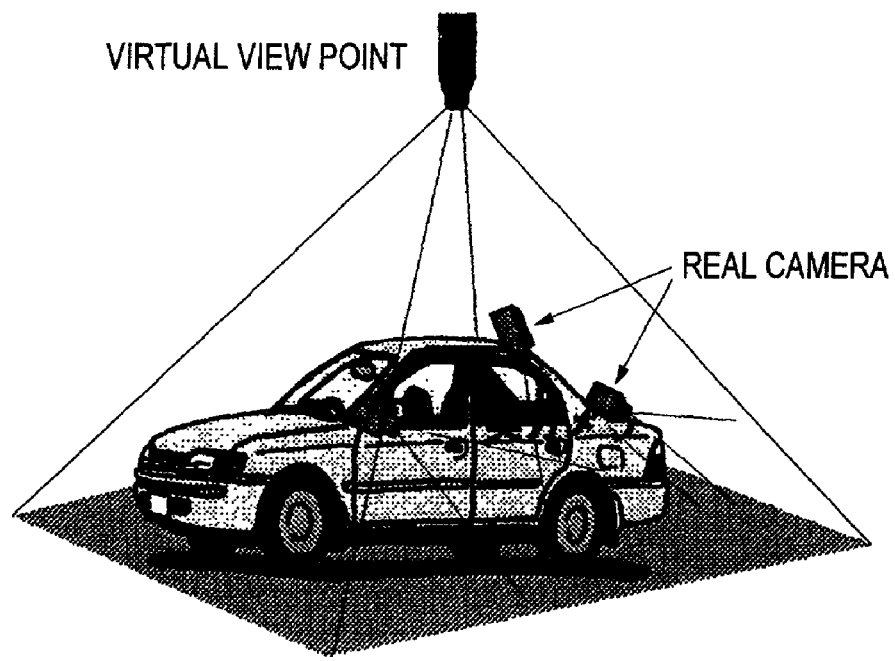
FIG. 11 is a diagram for explaining the conversion of the image viewpoint.
Figure 12:
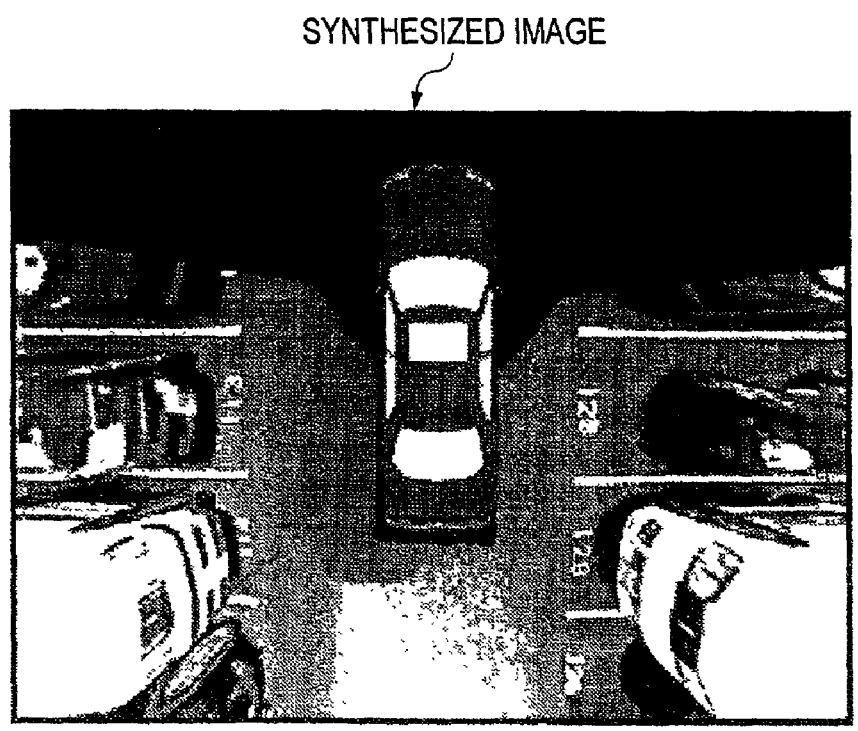
FIG. 12 is a diagram showing a synthesized image obtained by converting each camera image in FIG. 10 into an image viewed from the virtual viewpoint in FIG. 11.

The image extraction synthesization unit 13 in FIG. 5 extracts, from the image memories 121 to 128, images (images shown in FIG. 10) obtained by the cameras CAM1 to CAM8, and converts these images into images viewed from the virtual viewpoint in FIG. 11. Then, as is shown in FIG. 12, the image extraction synthesization unit 13 superimposes on the resultant images illustration data for the local vehicle to generate a synthesized image, and outputs the synthesized image. It should be noted that in FIG. 7 the indicated "common portions", between the camera images, include the overlapped areas of the adjacent images.

When the thus obtained synthesized image is displayed unchanged on the monitor device 16, because of backlighting the image obtained, for example, by the camera CAM5 may be almost white, while the image obtained by the camera CAM3 may be almost black. Further, when a vehicle is travelling through an area wherein sunshine is filtering through foliage, for example, either the right side of the screen will repetitively be brightened and the left side darkened or vice versa, because the car is randomly directly exposed to or shaded from the sunshine.

Therefore, when a synthesized image obtained simply by changing the viewpoints of the camera images is displayed on the monitor device 16, the brightness and the color of each portion on the screen will change greatly, at random, and screen flickering will be increased, making viewing the image difficult for a driver. Since this adversely affects the ability of the driver to use the screen to identify objects in the vicinity of the vehicle, the compensation signal generation means 14 and the image compensation means 15 perform a compensation process, which will be described later, for the synthesized image and display on the monitor device 16 an image that the driver can view without difficulty.

Figure 6:
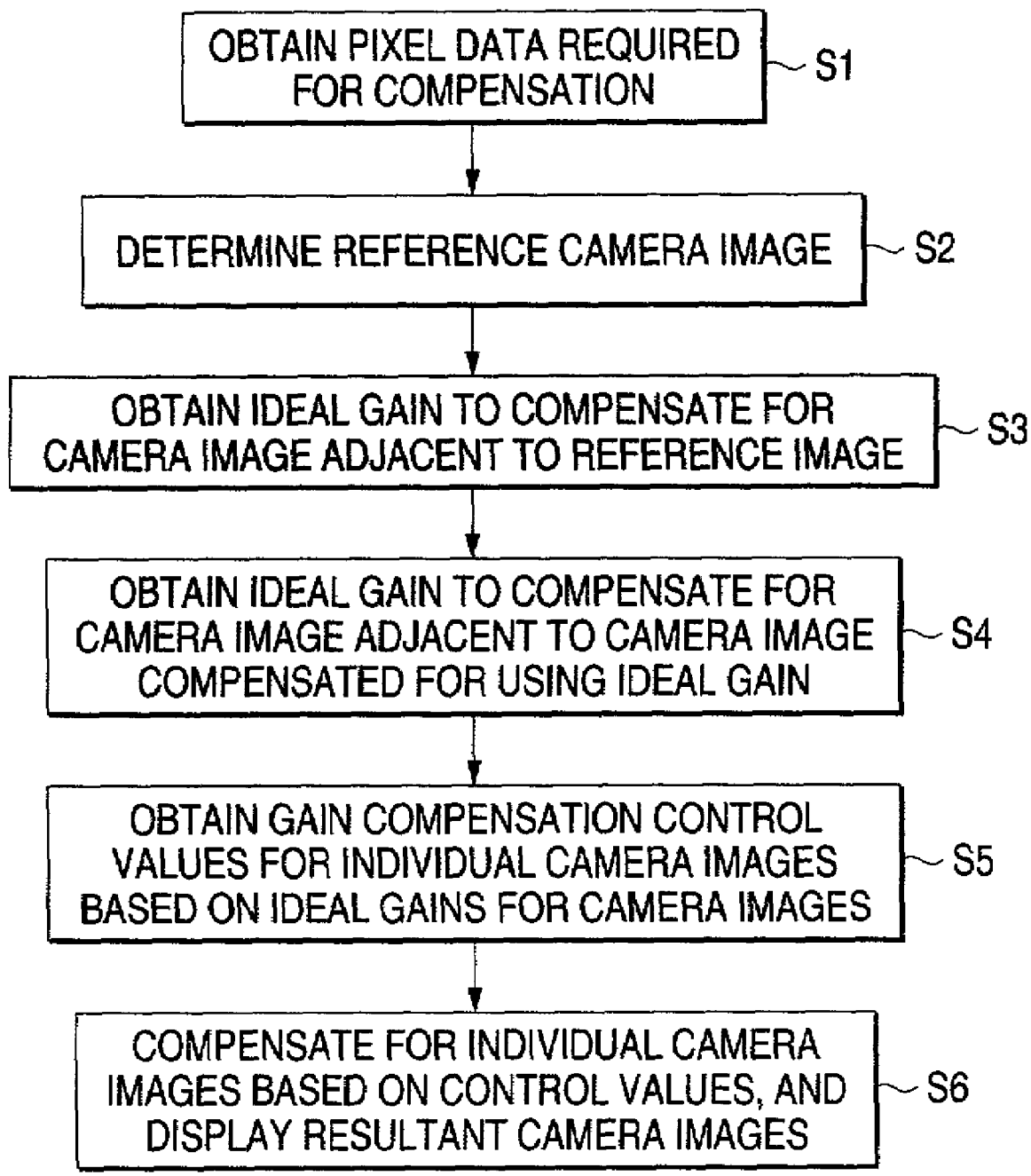
FIG. 6 is a flowchart showing image synthesis compensation processing performed by compensation signal generation means and the image syntheses display apparatus in FIG. 5.

FIG. 6 is a flowchart showing the image synthesis compensation processing performed by the compensation signal generation means 14 and the image compensation means 15 in FIG. 5. While each camera obtains ten images a second, for example, the image synthesis compensation processing is performed each time a picture is taken. First, at step S1 the compensation signal generation means 14 obtains the pixel data (the pixel data for the entire area of each camera image, or the pixel data for each overlapping area) required to perform a compensation process for a synthesized image.

At step S2, one of the camera images is selected as a reference camera image. As the reference camera image, of eight camera images one having an average luminance is selected. More specifically, a luminance value average is calculated using the pixel data obtained for multiple cameras at step S1. Thereafter, at step S2, the average pixel values for the individual camera images are obtained and are used to calculate another average value (the overall average value), and the camera image for which the average pixel value is nearest the overall average value is selected as the reference camera image. Here, assume that the image obtained by the camera CAM1 is selected as the reference camera image.

Figure 4B:
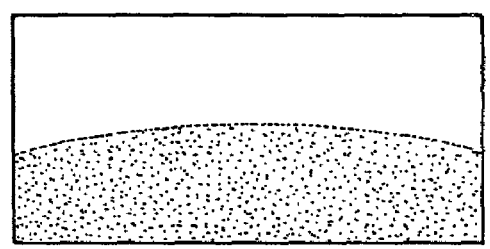
FIG. 4B is a diagram showing an example flag table wherein pixel data, for which a compensation value is required, are determined for the two camera images in FIG. 4A.

At step S3, an ideal gain is obtained so that the luminance levels of the camera images adjacent to the reference camera image correspond to that of the reference camera image. In the case shown in FIG. 7, the ideal gain is calculated so that the luminance of the image obtained by the camera CAM2 is the same as the luminance of the image obtained by the camera CAM1. During this process, as was previously described, the ideal gain may be so obtained that in the common portion A1 the average value for the pixel data for the camera CAM2 equals the average value for the pixel data for the camera CAM1. Either this, or the ideal gain may be so obtained, while disregarding the common portion Al, that the average value for all the pixel data for the camera CAM2 can be adjusted so that it equals the average value for the pixel data for the reference camera image. Further, when flag tables are employed, the ideal gain may be obtained merely by using the pixel data for the periphery of the vehicle, as is shown in FIG. 2C or 4B. In addition, at step S3, the ideal gain may also be so obtained that the luminance of the image obtained by the camera CAM8, after being adjusted, equals that of the image obtained by the camera CAM1.

At step S4, the pixel data for the image obtained by the camera CAM2, which has been corrected using the ideal gain, is employed to calculate an ideal gain for compensating for the pixel value of an image obtained by the adjacent camera CAM3. Further, the pixel data for the image obtained by the camera CAM8, which has been corrected using the ideal gain, is employed to calculate an ideal gain for compensating for the pixel value of an image obtained by the adjacent camera CAM7. The same process thereafter repeated to obtain ideal gains for compensating for the pixel values of the images obtained by the remaining cameras CAM4, CAMS and CAM6.

At step S5, the ideal gains for the camera images are employed to calculate a control value for a gain compensation for each camera image. At step S6, the compensation signal generation means 14 outputs the control values to the image compensation means 15, and in accordance with the control values, the image compensation means 15 compensates for the pixel values of the camera images and outputs the synthesized compensated images to the monitor device 16.

In this embodiment, the compensation process has been performed in the order CAM1 to CAM2, CAM8 to CAM3, CAM7 to CAM4 and CAM6 to CAM5. However, when the image obtained by the camera CAM1 is determined to be a reference camera image, all the luminance values for the remaining cameras CAM2 to CAM8 may be adjusted to the luminance value for the camera CAM1.

As is described above, in this embodiment the luminance values and the colors of the eight camera images are compensated for based on an adjacent camera image. Therefore, even if at the time images are taken there is a great difference between the image having the maximum luminance and the image having the minimum luminance, in the synthesized image that is displayed following the compensation process, the difference is reduced. Thus, the picture that is displayed can be seen easily. Further, even when a vehicle is travelling through an area wherein sunshine is filtering through foliage, and high luminance portions and low luminance portions are generated at random for each picture that is screened, the compensation process in this embodiment produces pictures for display in which there is little difference in luminance in the several portions of each picture. As a result, screen flickering is suppressed.

When the ideal gain differs greatly from the current gain, and when the current gain can be quickly corrected to match the ideal gain, it would appear that a displayed picture would be drastically altered. Therefore, it is preferable that a low-pass filter process be inserted in between and that a control value be determined that permits the current gain to be gradually brought closer to the ideal gain.

Figure 8:
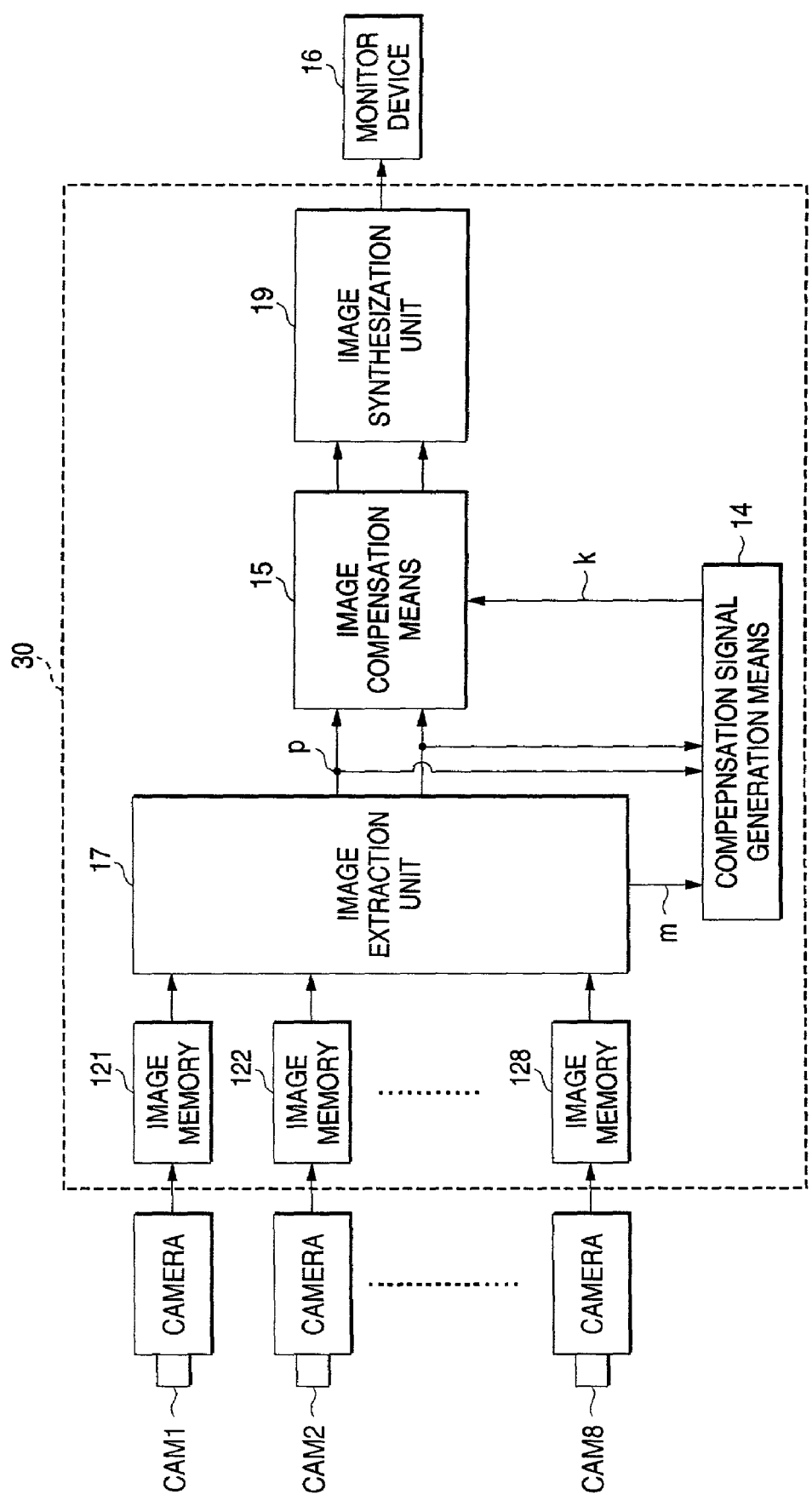
FIG. 8 is a diagram showing the configuration of an image synthesis display apparatus according to another embodiment of the present invention.
Figure 9A:
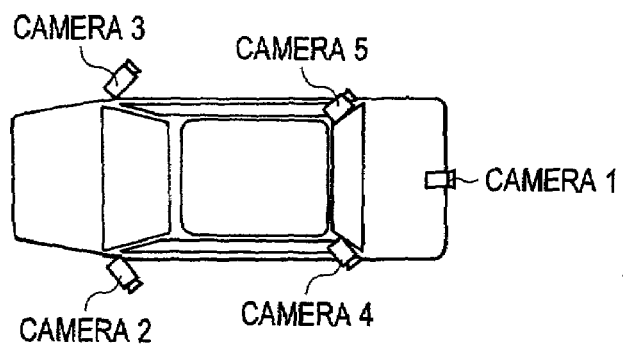
FIG. 9A is a top view of a vehicle on which five vehicle cameras are mounted.
Figure 9B:
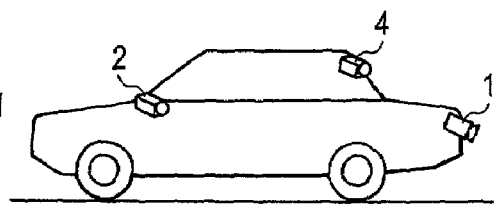
FIG. 9B is a side view of the vehicle in FIG. 9A.
Figure 10:
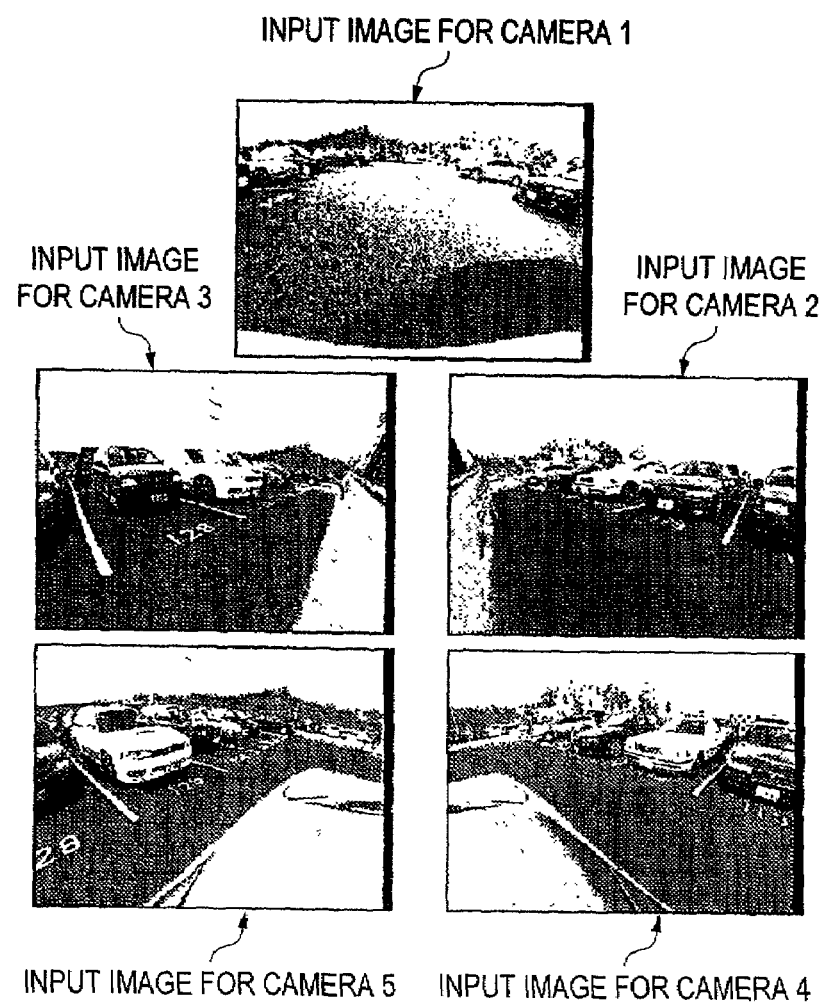
FIG. 10 is a diagram showing images obtained by the five vehicle cameras in FIG. 9.

FIG. 8 is a diagram showing the configuration of an image synthesis display apparatus according to another embodiment of the present invention. In the embodiment in FIG. 5, compensation has been performed for the synthesized image obtained from the camera images. However, in this embodiment, unlike the previous one, compensation is provided for individual camera images, and then the obtained images are synthesized. An image synthesis display apparatus 30 for this embodiment includes: image memories 121 to 128, provided in correlation with cameras CAM1 to CAM8; an image extraction unit 17, for obtaining image data from the image memories 121 to 128; compensation signal generation means 14, for generating and outputting a compensation gain k produced by using camera number data m, received from the image extraction unit 17, and image data extracted thereby; image compensation means 15, for performing image compensation based on the image data extracted by the image extraction unit 17 and the compensation gain k received from the compensation signal generation means 14; and an image synthesization unit 19, for converting the viewpoints of the compensated camera images and generating a synthesized image. The image data produced by the synthesization is output to a monitor device 16.

The image compensation may be performed at an arbitrary time, either before or after the image synthesization, or before or after the viewpoint conversion, as in the above embodiment. At any point in time, the same image compensation process can be performed.

The present invention has been explained in detail while referring to the specific embodiments. It will, however, be apparent to one having ordinary skill in the art that the present invention can be variously changed or corrected without departing from the spirit and the scope of the invention.

According to the present invention, when multiple camera images are synthesized, differences in the camera images can be reduced, and a synthesized image can be provided that can be easily viewed on a display.

What is claimed is:

1. An image synthesis display method for a vehicle camera comprising the steps of:
    obtaining images from a plurality of vehicle cameras shooting the periphery of a local vehicle;
    compensating the images obtained from the plurality of vehicle cameras to reduce differences between pixel data of the images of the plurality of vehicle cameras based on a flag table;
    superimposing the images to form a synthesized image;
    displaying the synthesized image on a screen of a display device,
    wherein the flag table defines pixel areas in the images obtained from adjacent vehicle cameras as pixel areas for the compensation process, the pixel areas corresponding to a common portion between the images obtained from the adjacent vehicle cameras; and wherein the images obtained from the plurality of vehicle cameras are compensated on the basis of pixel data of the images which correspond to the pixel areas defined by the flag table.

2. The image synthesis display method according to claim 1, wherein the compensation to reduce differences is performed to equalize average values of pixel data of adjacent camera images of the plurality of vehicle cameras.

3. The image synthesis display method according to claim 2, wherein the average values are obtained by using the entire pixel data of at least one of said adjacent camera images.

4. An image synthesis display method according to claim 2, wherein the average values are obtained by using pixel data of a vicinity of the local vehicle in the entire pixel data of at least one of the adjacent camera images.

5. The image synthesis display method according to claim 2, wherein the average values are obtained by using the pixel data of the overlapping shooting regions of the adjacent camera images.

6. The image synthesis display method according to claim 2, wherein the average values are obtained by using pixel data of the vicinity of said local vehicle in pixel data of the overlapping shooting regions of the adjacent camera images.

7. The image synthesis display method according to claim 2, wherein the flag table is prepared in correlation with pixel positions for the plurality of vehicle cameras, and the average values are obtained by using pixel data displayed at pixel positions that correspond to pixel areas written in advance in the flag table.

8. The image synthesis display method according to claim 1, wherein the values of the image data for which said differences are to be reduced represent brightness or colors.

9. The image synthesis display method according to claim 1, wherein the compensation is performed to gradually reduce differences along the time axis near a target compensation value.

10. An image synthesis display method for a vehicle camera comprising the steps of:

synthesizing images obtained by a plurality of vehicle cameras shooting the periphery of a local vehicle;

displaying a synthesized image on the screen of a display device, wherein the synthesized image of the plurality of vehicle cameras is displayed on the screen by performing a compensation to reduce differences between pixel data of the adjacent camera images of the plurality of vehicle cameras, wherein, when three or more vehicle cameras are prepared, a camera image whose average value is nearest the average value for pixel data for all the camera images is regarded as a reference image, wherein the compensation of the image data of the adjacent camera images are performed to adjust to the average value for the reference image.

11. The image synthesis display method according to claim 1, wherein the synthesized image is a synthesized image by synthesizing images of which a view point is changed; wherein the viewpoint is a virtual viewpoint viewed from above the local vehicle.

12. An image synthesis display apparatus for a vehicle camera, wherein images obtained by a plurality of vehicle cameras shooting a periphery of a local vehicle are superimposed to form a synthesized image and the synthesized image is displayed on the screen of a display device, comprising:

compensation means for carrying out an image synthesis display method according to claim 1.

13. The image synthesis display method according to claim 11, wherein the entire periphery of the local vehicle is identified on the screen.

14. The image synthesis display method according to claim 1, wherein the common portion is an overlapped area between the images obtained from adjacent vehicle cameras.

* * * * *